United States Patent
Onizuka et al.

(10) Patent No.: US 6,914,660 B2
(45) Date of Patent: Jul. 5, 2005

(54) METHOD FOR MANUFACTURING LIQUID CRYSTAL DISPLAY DEVICE

(75) Inventors: Emiko Onizuka, Shiojiri (JP); Yoichi Momose, Matsumoto (JP); Yoshitomo Hirata, Toyoshina-machi (JP); Takehito Washizawa, Suwa (JP); Masahiro Kosuge, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 76 days.

(21) Appl. No.: 10/658,268

(22) Filed: Sep. 10, 2003

(65) Prior Publication Data

US 2004/0095525 A1 May 20, 2004

(30) Foreign Application Priority Data

Sep. 30, 2002 (JP) .................................. 2002-286124

(51) Int. Cl.⁷ ............................................ G02F 1/1339
(52) U.S. Cl. .................................................. 349/155
(58) Field of Search ................... 349/155, 158, 349/187

(56) References Cited

U.S. PATENT DOCUMENTS

| | | | | |
|---|---|---|---|---|
| 4,966,442 A | * | 10/1990 | Ono et al. | 349/155 |
| 6,441,880 B1 | * | 8/2002 | Utsumi et al. | 349/155 |
| 6,842,278 B1 | * | 1/2005 | Sakamaki et al. | 359/296 |

FOREIGN PATENT DOCUMENTS

JP          A 11-281985          10/1999

* cited by examiner

*Primary Examiner*—Toan Ton
(74) *Attorney, Agent, or Firm*—Oliff & Berridge, PLC

(57) ABSTRACT

To provide a method for manufacturing a liquid crystal display device capable of preventing nozzle clogging and a variation in spacers, and obtaining a liquid crystal display device with high display quality. The method includes an aggregation heating step of heating a substrate to evaporate droplets to the extent that spacers discharged to the substrate aggregate in a predetermined range, and a complete evaporation heating step of further heating the substrate subjected to the aggregation heating step to completely evaporate the droplets. In the aggregation heating step, the substrate is heated to a temperature of 30 to 60° C., and a drying time of 30 seconds is secured for the solvent.

5 Claims, 3 Drawing Sheets

FIG. 1

| Substrate temperature (°C) | 20 | 30 | 40 | 50 | 60 | 70 |
|---|---|---|---|---|---|---|
| Rate of defective spreading of solvent (%) | 5 | 0 | 0 | 0 | 0 | 0 |

FIG. 2

| Substrate temperature (°C) | 20 | 30 | 40 | 50 | 60 | 70 |
|---|---|---|---|---|---|---|
| Ratio of nozzles (%) | 0 | 0 | 0 | 0 | 0 | 7 |

FIG. 3

| Substrate temperature (°C) | 20 | 30 | 40 | 50 | 60 | 70 | 80 |
|---|---|---|---|---|---|---|---|
| Rate of defective spreading of solvent (%) | 5 | 0 | 0 | 0 | 0 | 0 | 0 |
| Rate of defective aggregation of spacer (%) | 3 | 0 | 0 | 0 | 0 | 2 | 5 |

FIG. 4

| Substrate temperature (°C) | 20 | 30 | 40 | 50 | 60 | 70 | 80 |
|---|---|---|---|---|---|---|---|
| Ratio of nozzles (%) | 0 | 0 | 0 | 0 | 0 | 12 | 32 |

METHOD FOR MANUFACTURING LIQUID CRYSTAL DISPLAY DEVICE

BACKGROUND OF THE INVENTION

1. Field of Invention

The present invention relates to a method for manufacturing a liquid crystal display device. More specifically, the invention relates to a method for manufacturing a liquid crystal display device capable of preventing nozzle clogging and variations of spacers, and obtaining a liquid crystal display device having high display quality.

2. Description of Related Art

In a liquid crystal display device, spherical spacers are disposed between substrates, for maintaining a constant gap between the substrates. A technique for arranging the spacers can include spraying the spacers mixed in a solvent on a substrate subjected to an orientation treatment. However, this spraying device for disposing the spacers causes a nonuniform distribution of the spaces on the substrate. Particularly, when many spacers aggregate in a region (referred to as a pixel region) used for a display, brightness of coloration decreases, or uneven color occurs to cause the problem of deteriorating display quality.

In order to solve the problem, for example, Japanese Unexamined Patent Application Publication No. 11-281985 discloses a technique for discharging spacers from a droplet discharge apparatus to accurately arrange the spacers in a region (referred to as a non-pixel region (black matrix) hereinafter) not used for a display, improving a contrast of a liquid crystal display device. In this technique, the spacers are dispersed in a mixed solvent (boiling point 100° C. or more) of water and ethylene glycol, and the solvent is discharged to the non-pixel region of a substrate to arrange the spacers, and is further evaporated by heating the substrate to fix the spacers at a predetermined position. The substrate is heated to a substrate temperature of 60° C. or more for evaporating the solvent.

However, with a substrate temperature of 60° C. or more, the solvent evaporates in a long-term work (for example, 8 hours or more) to clog a nozzle tip with the spacers. Also, when spacers (referred to as adhesive spacers hereinafter) having adhesive surface layers are used, the adhesive layers are melted to further clog the nozzle with the spacers. Therefore, the spacers cannot be stably discharged to cause the problem of forming a portion in which the spacers are not disposed on the surface of the substrate.

On the other hand, with a low substrate temperature (for example, 30° C. or less), solvent droplets slowly evaporate when a mixture of spacers and a solvent is ejected onto the surface of the substrate by an ink-jet (droplet discharge) system, and thus the solvent spreads during a movement of the substrate to a next step, thereby causing the problem of deviating the spacers from the predetermined position.

Furthermore, in the use of the adhesive spacers, the solvent rapidly evaporates by heating the substrate to 60° C. or more, and thus an aggregation rate of the spacers is lower than an evaporation rate of the solvent, thereby causing the problem of failing to appropriately aggregate the spacers at the predetermined position of the non-pixel region. Furthermore, in the use of the adhesive spacers, the adhesive layers are melted by being heated to the substrate temperature before the spacers aggregate at the predetermined position, thereby causing the problem of possibly arranging the spacers in the pixel region.

Also, since the solvent is successively ejected onto the surface of the substrate by the ink-jet (droplet discharge) system, a time difference occurs between a first landing position and a last landing position on the substrate to cause a difference in evaporation time between both landing positions, thereby causing a difference in evaporation condition. Therefore, if the substrate is moved to a next step before the solvent does not sufficiently evaporate, the spacers do not aggregate at a center of the landing point to possibly cause a variation in arrangement of the spacers.

SUMMARY OF THE INVENTION

As described above, the solvent excessively or deficiently evaporates due to an excess or deficiency of the heating temperature of the substrate and an excess or deficiency of the heating time, thereby causing nozzle clogging and a variation in the spacers. There is thus the problem of decreasing the contrast of a liquid crystal display device and causing a variation in the cell gap.

The present invention has been achieved in the consideration of the above-described situation, and an object of the present invention is to provide a method for manufacturing a liquid crystal display device capable of preventing nozzle clogging and a variation in spacers, and obtaining a liquid crystal display device with high display quality.

In order to achieve the object, according to the present invention, a method for manufacturing a liquid crystal display device is disclosed in which droplets of a solvent containing a plurality of spacers are discharged to a substrate by a droplet discharge device. Then the substrate is heated to evaporate the droplets and arrange the spacers on the substrate. The method can include an aggregation heating step of heating the substrate to evaporate the droplets to the extent that the spacers discharged to the substrate aggregate within a predetermined range, and a complete evaporation heating step of further heating the substrate subjected to the aggregation heating step to completely evaporate the droplets.

In the aggregation heating step, the substrate can be heated to the extent that the spacers discharged to the substrate aggregate within the predetermined range (for example, a predetermined position of a non-pixel region), and thus spreading (scattering of the spacers) due to insufficient evaporation of the solvent or nozzle clogging due to excessive evaporation can be prevented. In the complete evaporation heating step, the substrate is heated for a predetermined time to completely evaporate the droplets, and thus the spacers can be precisely arranged at the predetermined position. In these steps, a precise arrangement of the spacers on the substrate and stable coating can be realized to secure a uniform cell gap, thereby achieving a liquid crystal display device with high display quality.

The method for manufacturing the liquid crystal display device of the present invention is characterized in that the heating temperature of the substrate in each of the aggregation heating step and the complete evaporation heating step is lower than the boiling point of the solvent. Therefore, an excessive increase in the evaporation rate of the solvent can be prevented to secure a sufficient time required for aggregating the spacers, thereby permitting a precise arrangement of the spacers at the predetermined position.

The method for manufacturing the liquid crystal display device of the present invention can be characterized in that when the spacers to be arranged on the substrate have adhesive surface layers, the heating temperature of the substrate in the aggregation heating step is lower than the melting temperature of the adhesive layers. Therefore, the adhesive layers of the spacers can be prevented from being melted by radiant heat from the substrate to prevent fixing of the adhesive layers at the tip of a nozzle, thereby maintaining stable discharge performance of the nozzle.

The method for manufacturing the liquid crystal display device of the present invention can be characterized in that the heating temperature of the substrate in the aggregation heating step is 30 to 60° C. Therefore, spreading (scattering of the spacers) due to insufficient evaporation of the solvent or nozzle clogging due to excessive evaporation can be prevented under conditions frequently used in a general manufacturing process.

The method for manufacturing the liquid crystal display device of the present invention can be characterized in that the heating time of the substrate in the aggregation heating step is 30 seconds or more. Therefore, insufficient evaporation of the solvent can be prevented under conditions frequently used in a general manufacturing process, and thus a sufficient time required for aggregating the spacers can be secured to permit a precise arrangement of the spacers at the predetermined position.

BRIEF DESCRIPTION OF THE DRAWINGS

The invention will be described with reference to the accompanying drawings, wherein like numerals reference like elements, and wherein:

FIG. 1 is a table showing a relation between a substrate temperature and a rate of defective spreading of a solvent;

FIG. 2 is a table showing a ratio of nozzles having spacer lumps adhering thereto;

FIG. 3 is a table showing defective spreading of a solvent and defective aggregation of spacers;

FIG. 4 is a table showing a ratio of nozzles having spacer lumps adhering thereto;

DETAILED DESCRIPTION OF PREFERRED EMBODIMENTS

Figure 5:
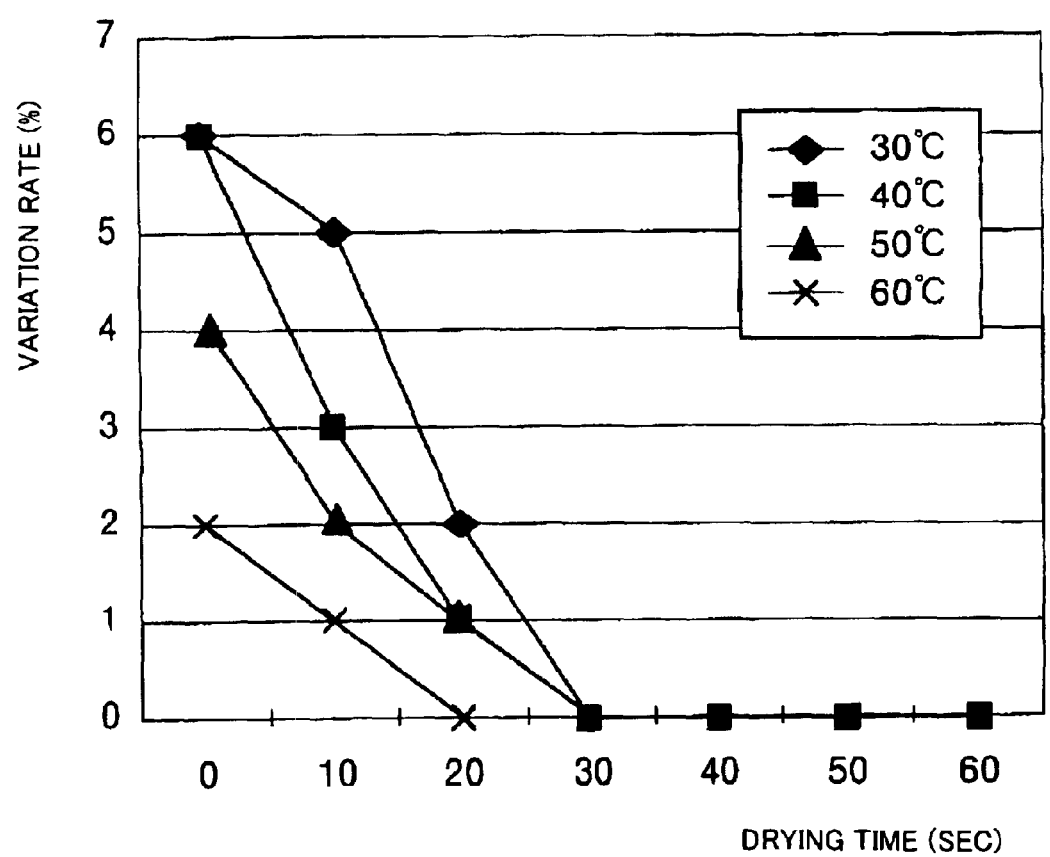
FIG. 5 is a graph showing variations in ordinary type spacers and a solvent drying time.

A method for manufacturing a liquid crystal display device according to embodiments of the present invention will be described in detail below with reference to the drawings. It should however be understood that the present invention is not limited to these embodiments.

FIG. 1 is a table showing a relation between a substrate temperature and a rate of defective spreading of a solvent after landing on a substrate, and FIG. 2 is a table showing a relation between the substrate temperature and a ratio of nozzles having spacer lumps adhering thereto. In the first embodiment, the substrate temperature was set to various values by an ink-jet (droplet discharge) process under the conditions below. A mixture (droplets) of resin spherical spacers and a solvent was discharged to a non-pixel region of the surface of the substrate, and an examination was conducted for defective spreading of the solvent after landing on the substrate and for adhesion of spacers lumps to the nozzle tip.

The term defective spreading of the solvent is the defect that occurs after the mixture is landed, and is the solvent that spreads to arrange the spacers contained in the droplets in a region out of a predetermined range. For example, the adjacent droplets adhere to form a droplet having a diameter more than a predetermined diameter and to scatter the spacers, or the solvent enters a pixel region to arrange the spacers in the pixel region.

For example, in a droplet discharge head, a nozzle diameter was 20 $\mu$m, a discharge amount of the mixture containing the spacers and the solvent was about 20 pl, and a distance between the nozzle and the substrate was 800 $\mu$m. The substrate used was a glass substrate on which an alignment film (produced by Nissan Chemical Co., Ltd.: SE3140) was coated to a thickness of 500 Å. Each of the spacers was a resin sphere (produced by Sekisui Chemical Co., Ltd.: SP-20375) of 3.75 $\mu$m in diameter. The solvent was a mixed solution (for example, a viscosity of 10 to 40 mPA·s, and a boiling point of about 150 to 250° C.) containing water and ethylene glycol at 1:1. The substrate was heated in a range of 20 to 70° C. on a hot plate, and measurement was carried out at every increase of 10° C. of the substrate temperature.

FIG. 1 indicates that with a substrate temperature of less than 30° C., the solvent is likely to spread (an appearance rate of 5% with a substrate temperature of 20° C.) after the mixed solution is landed on the substrate. It was also confirmed that the adjacent droplets adhere to each other due to spreading of the solvent to scatter the spacers in a region out of the desired range. It is thus found that the substrate is preferably heated to a temperature of 30° C. or more for aggregating the spacers in the predetermined range.

FIG. 2 indicates that with a substrate temperature of 70° C. or more, nozzles having spacer lumps adhering thereto appear (an appearance rate of 7% with a substrate temperature of 70° C.). This is due to the phenomenon that the substrate temperature is excessively high, and thus the solvent evaporates at the nozzle tip by radiant heat from the substrate. It is thus found that in order to prevent adhesion of spacer lumps to the nozzle tip, the substrate is preferably heated to a temperature of 60° C. or less.

As described above, in the first embodiment, the substrate may be heated to a substrate temperature of 30 to 60° C. to evaporate the droplets to the extent that the spacers discharged to the substrate aggregate in the predetermined range (the aggregation heating step), and in this state, the substrate may be further heated for a predetermined time to completely evaporate the droplets (the complete evaporation heating step), thereby permitting a precise arrangement of the spacers at the predetermined position. In these steps, a precise arrangement of the spacers on the substrate and stable coating can be realized to secure a uniform cell gap, thereby obtaining a liquid crystal display device with high display quality.

Although, in the first embodiment, a description is made of only the steps of heating the substrate to which the spacers are discharged, other steps can be performed by known conventional techniques.

FIG. 3 is a table showing a substrate temperature, defective spreading of the solvent, and defective aggregation of spacers, and FIG. 4 is a table showing a relation between the substrate temperature and a ratio of nozzles having spacer lumps adhering thereto. In the second embodiment, the substrate temperature was set to various values by an ink-jet (droplet discharge) process under the conditions below. A mixture of adhesive spacers and a solvent was discharged to a non-pixel region of the surface of the substrate, and an examination was conducted for defective spreading of the solvent after landing on the substrate, and defective aggregation of the spacers due to evaporation of the solvent.

Furthermore, whether or not spacer lumps adhered to the nozzle tips was examined. The term defective aggregation of the spacers is a defect that occurs after the mixture is landed, and the solvent spreads to arrange the spacers contained in the droplets in a region out of the predetermined range, or a defect that the spacers do not appropriately aggregate because of an excessively high evaporation rate of the solvent (insufficient aggregation).

For example, in a droplet discharge head, a nozzle diameter was 20 μm, a discharge amount of the mixture containing the spacers and the solvent was about 20 pl, and a distance between the nozzle and the substrate was 800 μm. The substrate used was a glass substrate on which an alignment film (produced by Nissan Chemical Co., Ltd.: SE3140) was coated to a thickness of 500 Å. Each of the spacers was a resin sphere (produced by Sekisui Chemical Co., Ltd.: SP-20375AD) of 3.75 μm in diameter having an adhesive layer on the surface. The solvent was a mixed solution (for example, a viscosity of 10 to 40 mPA·s, and a boiling point of about 150 to 250° C.) containing water and ethylene glycol at 1:1. The substrate was heated in a range of 20 to 80° C. on a hot plate, and measurement was carried out at every increase of 10° C. of the substrate temperature.

FIG. 3 indicates that with a substrate temperature of less than 30° C., the solvent is likely to spread (an appearance rate of 5% with a substrate temperature of 20° C.) after the mixture is landed on the substrate. It was also confirmed that the adjacent droplets adhere to each other due to spreading of the solvent to scatter the spacers to a region out of a desired range (a rate of defective spacer aggregation of 3% with a substrate temperature of 20° C.).

With a substrate temperature of 70° C. or more, defective aggregation of the spacers was confirmed (insufficient aggregation; a rate of defective spacer aggregation of 2% with a substrate temperature of 70° C., and a rate of defective spacer aggregation of 5% with a substrate temperature of 80° C.). This is considered attributable to the phenomenon that an aggregation rate of the spacers can not keep up with an excessively high evaporation rate of the solvent due to the high substrate temperature. It is thus found that the substrate is preferably heated to a temperature of 30 to 60° C. for aggregating and arranging the spacers in the predetermined range.

FIG. 4 indicates that with a substrate temperature of 70° C. or more, nozzles having spacer lumps adhering thereto appear (an appearance rate of 12% with a substrate temperature of 70° C., and an appearance rate of 32% with a substrate temperature of 80° C.). These appearance rates are found to be higher than that in the first embodiment (FIG. 2 shows an appearance rate of 7% with a substrate temperature of 70° C.). In the use of the adhesive spacers, with a substrate temperature of 70° C. or more, the solvent rapidly evaporates, and the adhesive layers are melted by radiant heat from the substrate to be easily fixed at the nozzle tip. It is thus found that in order to maintain the stable performance of the nozzles without adhesion of spacer lumps to the nozzle tip, the substrate is preferably heated to a temperature of 60° C. or less which is lower than the melting temperature of the adhesive layers.

As described above, like in the first embodiment, in the second embodiment using the adhesive spacers, by heating the substrate to a substrate temperature of 30 to 60° C. (the aggregation heating step), a precise arrangement of the spacers on the substrate and stable coating can be realized to secure a uniform cell gap. After aggregation of the spacers is completed, the substrate is further heated to completely evaporate the solvent, completing the arrangement of the spacers (complete evaporation heating step).

Figure 6:
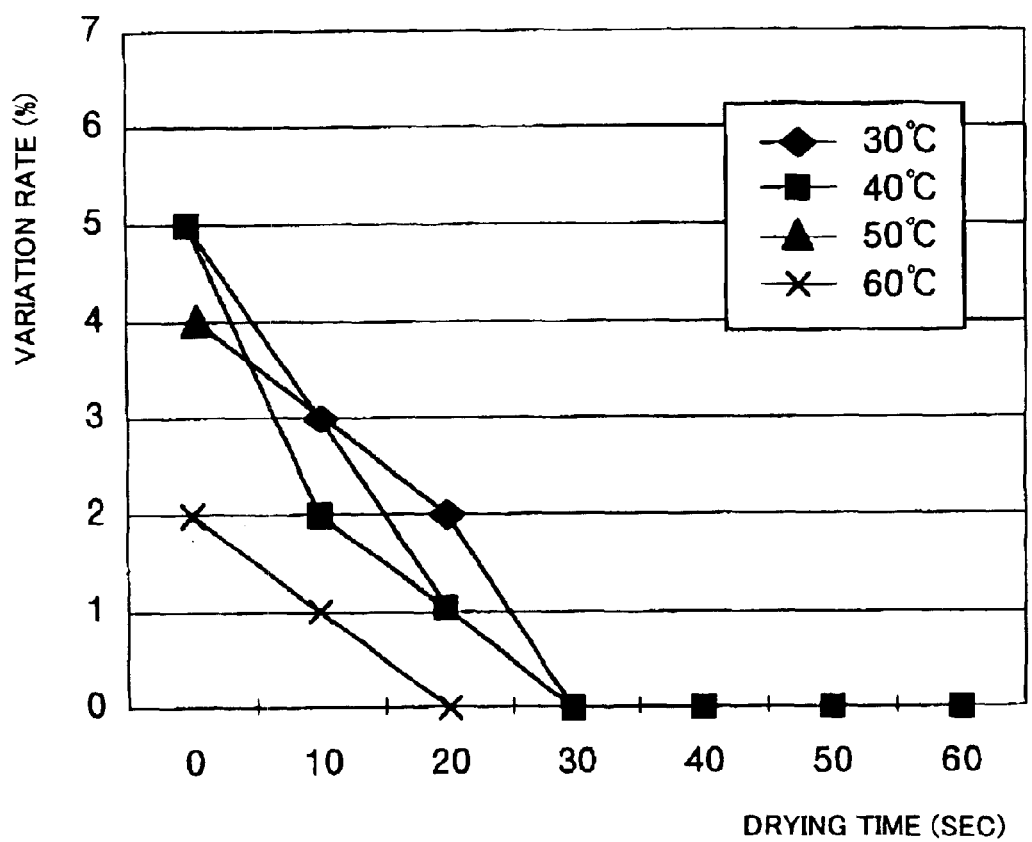
FIG. 6 is a graph showing variations in adhesive type spacers and a solvent drying time.

FIG. 5 is a graph showing a relation between variations in ordinary-type spacers and a drying time of a solvent, and FIG. 6 is a graph showing a relation between variations in adhesive-type spacers and a drying time of a solvent. In the third embodiment, the substrate temperature was set as a parameter to 30 to 60° C. by an ink-jet (droplet discharge) process under the conditions below, and an examination was conducted for a relation between a variation rate of the arranged spacers and a drying time of a solvent. The term a variation rate of the spacers is a rate of the spacers arranged out of a predetermined range due to incomplete aggregation of the spacers.

For example, in a droplet discharge head, a nozzle diameter was 20 μm, a discharge amount of the mixture containing the spacers and the solvent was about 20 pl, and a distance between the nozzle and the substrate was 800 μm. The substrate used was a glass substrate on which an alignment film (produced by Nissan Chemical Co., Ltd.: SE3140) was coated to a thickness of 500 Å. As the spacers, resin spheres (produced by Sekisui Chemical Co., Ltd.: SP-20375) each having a diameter of 3.75 μm, and resin spheres (produced by Sekisui Chemical Co., Ltd.: SP-20375AD) each having a diameter of 3.75 μm and an adhesive surface layer were used.

The solvent was a mixed solution (for example, a viscosity of 10 to 40 mPA·s, and a boiling point of about 150 to 250° C.) containing water and ethylene glycol at 1:1. In consideration of the examination results of the first and second embodiments, the substrate was heated to each of 30° C., 40° C., 50° C. and 60° C. as a parameter on a hot plate.

A relation between a variation rate of the spacers and the drying time (the time to place the substrate on the hot plate) of the solvent necessary for evaporating the solvent and aggregating the spacers at the predetermined position was examined. As a result, a graph of FIG. 5 was obtained by using the ordinary type spacers, and a graph of FIG. 6 was obtained by using the adhesive type spacers. In each of the figures, a result with the substrate temperature of 30° C. is marked with a rhombus, a result with the substrate temperature of 40° C. is marked with a square, a result with the substrate temperature of 50° C. is marked with a triangle, and a result with the substrate temperature of 60° C. is marked with a cross.

FIGS. 5 and 6 indicate that with respect to both the ordinary type and adhesive type spacers, a maximum variation rate of the spacers is 6% with a solvent drying time of 30 seconds or less. This can be because the solvent does not sufficiently evaporate due to a short drying time, thereby failing to aggregate and arrange the spacers contained in the droplets within the predetermined range. It is thus found that with the substrate heated to 30 to 60° C., the substrate drying step (aggregation heating step) is preferably set so that the drying time of the solvent is 30 second or more for aggregating and arranging the spacers in the predetermined range.

The heating temperature of the substrate is preferably lower than the boiling point of the solvent. This is because the evaporation rate of the solvent can be appropriately set to secure a sufficient time required for aggregating the spacers, thereby precisely arranging the spacers at the predetermined position. After the aggregation of the spacers is completed, the substrate is further heated to completely evaporate the solvent, completing the arrangement of the spacers (the complete evaporation heating step).

As described above, in the third embodiment, the solvent containing the ordinary type or adhesive type spacers is coated by the ink-jet (droplet discharge) process on the substrate heated to 30 to 60° C., and then dried for a drying time of 30 seconds or more. Therefore, a precise arrangement of the spacers on the substrate and stable coating can be realized to secure a uniform cell gap.

Although, in the third embodiment, the drying time of the solvent is set to 30 seconds or more so that a variation rate of the spacers is 0%, the drying time may be set to less than 30 seconds when a variation rate of over 0% is allowable (for example, a variation rate in the range of 0 to 6%) in relation to the display quality of a liquid crystal display device.

While this invention has been described in conjunction with specific embodiments thereof, it is evident that many alternatives, modifications, and variations will be apparent to those skilled in the art. Accordingly, preferred embodiments of the invention as set forth herein are intended to be illustrative, not limiting. Various changes may be made without departing from the spirit and scope of the invention.

What is claimed is:

1. A method for manufacturing a liquid crystal display device in which droplets of a solvent containing a plurality of spacers are discharged to a substrate by a droplet discharge device, and then the substrate is heated to evaporate the droplets and arrange the spacers on the substrate, the method comprising:

an aggregation heating step of heating the substrate to evaporate the droplets to an extent that the spacers discharged to the substrate aggregate within a predetermined range; and a complete evaporation heating step of further heating the substrate having the spacers aggregated in the predetermined range to completely evaporate the droplets.

2. The method for manufacturing a liquid crystal display device according to claim 1, the heating temperature of the substrate in each of the aggregation heating step and the complete evaporation heating step being lower than a boiling point of the solvent.

3. The method for manufacturing a liquid crystal display device according to claim 1, wherein, when the spacers to be arranged on the substrate have adhesive surface layers, a heating temperature of the substrate in the aggregation heating step is lower than a melting temperature of an adhesive layer.

4. The method for manufacturing a liquid crystal display device according to claim 1, a heating temperature of the substrate in the aggregation heating step being 30 to 60° C.

5. The method for manufacturing a liquid crystal display device according to claim 1, a heating time of the substrate in the aggregation heating step being 30 seconds or more.

* * * * *